United States Patent
Othman et al.

(10) Patent No.: US 10,966,161 B2
(45) Date of Patent: Mar. 30, 2021

(54) BLUETOOTH IN-PACKET POWER TRIMMING

(71) Applicant: Avago Technologies International Sales Pte. Limited, Singapore (SG)

(72) Inventors: Mohamed Abou Bakr Othman, Irvine, CA (US); Thomas Baker, Irvine, CA (US); Vincent Roussel, Irvine, CA (US); Federico Cattivelli, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 59 days.

(21) Appl. No.: 16/261,480

(22) Filed: Jan. 29, 2019

(65) Prior Publication Data

US 2020/0245261 A1 Jul. 30, 2020

(51) Int. Cl.
*H04W 52/24* (2009.01)
*H04W 52/36* (2009.01)
*H04W 4/80* (2018.01)
*H04W 52/52* (2009.01)
*H04W 52/22* (2009.01)

(52) U.S. Cl.
CPC .......... *H04W 52/246* (2013.01); *H04W 4/80* (2018.02); *H04W 52/226* (2013.01); *H04W 52/362* (2013.01); *H04W 52/52* (2013.01)

(58) Field of Classification Search
CPC . H04W 52/146; H04W 52/226; H04W 52/52; H04W 52/362; H04W 52/246; H04W 52/245; H04W 4/80; H04W 74/004; H04B 17/21; H04B 17/318
See application file for complete search history.

(56) References Cited

U.S. PATENT DOCUMENTS

| | | | | |
|---|---|---|---|---|
| 7,620,371 B2* | 11/2009 | Zolfaghari | ............... | H04B 1/40 455/115.1 |
| 2007/0109955 A1* | 5/2007 | Moorti | .................. | H04W 52/42 370/206 |
| 2007/0229330 A1* | 10/2007 | Guda | ................... | H03G 3/3042 341/106 |
| 2009/0052575 A1* | 2/2009 | Waheed | ................ | H04W 52/08 375/297 |
| 2010/0273518 A1* | 10/2010 | Suzuki | .................. | H04W 52/30 455/522 |
| 2019/0200303 A1* | 6/2019 | Nakahara | ............. | H04B 17/309 |

* cited by examiner

*Primary Examiner* — Ricardo H Castaneyra
(74) *Attorney, Agent, or Firm* — Foley & Lardner LLP

(57) ABSTRACT

In some aspects, the disclosure is directed to methods and systems for in-packet transmission power control. Measurement circuitry in communication with a transmission stage of a device is configured to generate a transmitted signal strength measurement signal based on an output of the transmission power amplifier during transmission of a packet. Measurement conversion circuitry connected to the measurement circuitry is configured to convert the transmitted signal strength measurement signal from the measurement circuitry to an output power measurement. Power control circuitry connected to the measurement conversion circuitry is configured to generate a power correction signal based on the output power measurement and an output power target value. Power ramping circuitry connected to the power control circuitry is configured to provide a gain signal to the transmission stage of the device based on the power correction signal.

23 Claims, 7 Drawing Sheets

BLUETOOTH IN-PACKET POWER TRIMMING

FIELD OF THE DISCLOSURE

This disclosure generally relates to systems and methods for wireless communications. In particular, this disclosure relates to systems and methods for wireless transmission power control.

BACKGROUND OF THE DISCLOSURE

Many implementations of wireless communications protocols have transmission power requirements to comply with regulatory limits, prevent interference with other devices, preserve battery life, etc. However, controlling transmission power may be difficult, as components such as power amplifiers may be highly sensitive to temperature and other environmental factors, as well as process and voltage variation. In order to maintain link quality at the receiving side, and to maintain a predictable transmit power for every packet, changes in transmission power need to be compensated.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
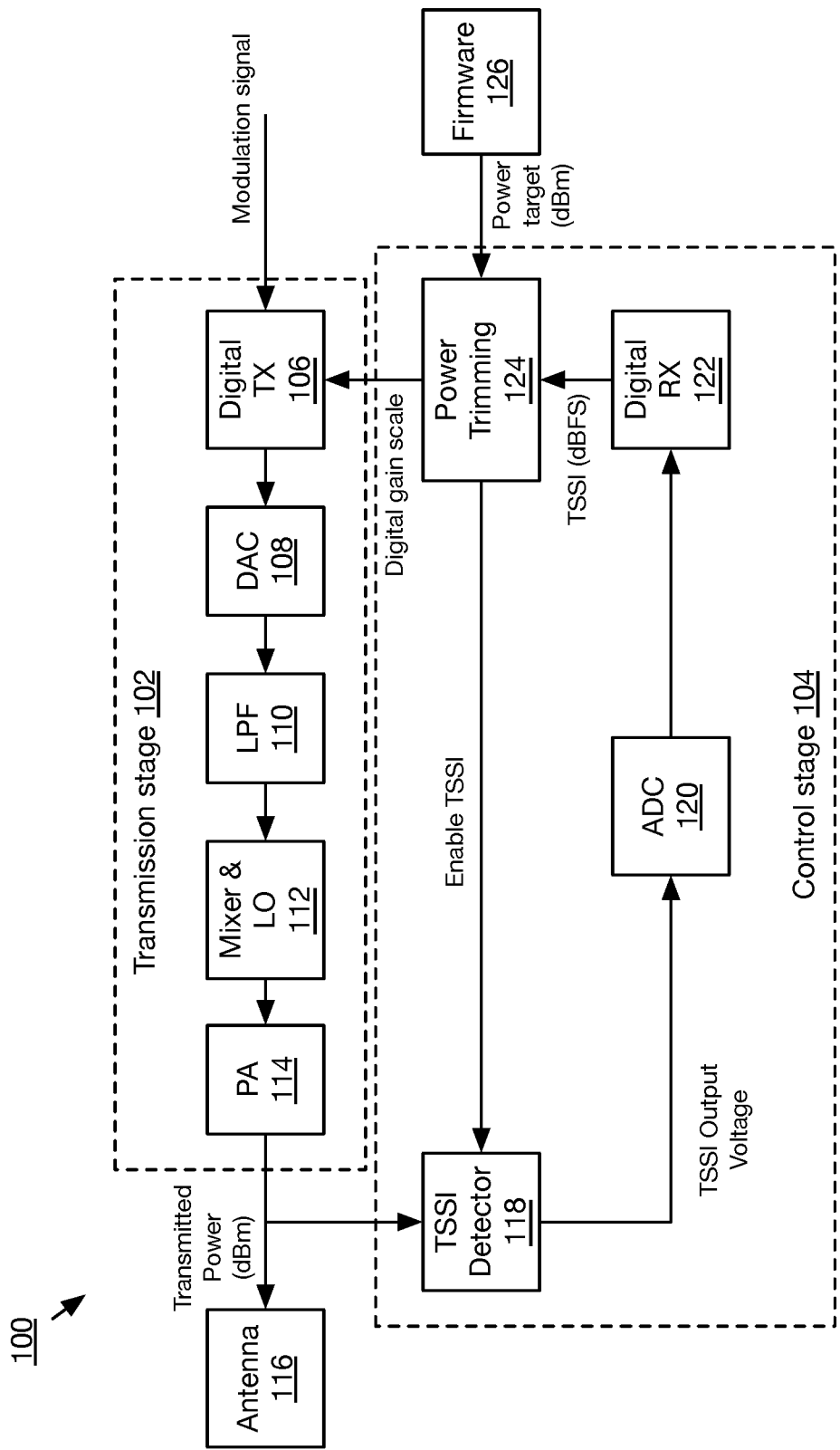
FIG. 1A is a block diagram depicting an embodiment of a wireless communication device implementing in-packet power trimming.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE 802.15.1™ ("Bluetooth"), IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for in-packet power trimming; and Section B describes a network environment and computing environment which may be useful for practicing embodiments described herein.

A. In-Packet Power Trimming

Many implementations of wireless communications protocols have transmission power requirements to comply with regulatory limits, prevent interference with other devices, preserve battery life, etc. However, controlling transmission power may be difficult, as components such as power amplifiers may be highly sensitive to temperature and other environmental factors, as well as process and voltage variation. In order to maintain link quality at the receiving side, and to maintain a predictable transmit power for every packet, changes in transmission power need to be compensated.

Some implementations of wireless devices may utilize a temperature compensation algorithm (TCA) using open loop power control. In such implementations, the TCA stores power amplifier gain control words at different temperatures and frequencies to represent how temperature affects the power. These TCA tables are typically stored in firmware of the device and may be populated using factory power calibration. Periodically, such as every 30 seconds, the TCA runs and, based on temperature, the power amplifier gain control words are updated. These systems require significant calibration efforts, calibrating the device for transmission at each specified target power level, at a large number of frequencies or channels, in multiple operational modes, adding expense to the device and slowing manufacturing. Furthermore, due to the slow periodicity of execution of the TCA, gain is typically adjusted only between packets. As a result, between these TCA execution instances and based on environmental changes or power changes, transmission power may drift from the power target.

Instead, the present systems and methods are directed to an implementation of power amplifier gain trimming using closed loop power control. Power is compensated dynamically for each packet, e.g. during transmission of a header of the packet, significantly reducing power drift. Additionally, only the transmitted signal strength indicator (TSSI) detector circuitry needs to be factory calibrated, reducing calibration effort and thus reducing manufacturing time and costs. TCA tables may be replaced or eliminated in some implementations, reducing memory requirements in firmware or other storage of the device, and the power control scheme of the device may be simplified.

For example, in one implementation using the Bluetooth wireless protocol, in-packet power trimming may allow tuning of Bluetooth transmission power over temperature, voltage and process changes, regardless of Bluetooth packet type, mode of operation, or target power level. In many implementations, the Bluetooth packet header may be used to measure the transmitted power and power correction may be applied accordingly, given that BT packet header uses constant envelope modulation (Gaussian frequency shift keying, or GFSK). Although discussed primarily in terms of the Bluetooth protocol, the systems and methods discussed herein may be used with any suitable protocol having a constant envelope modulated header (e.g. frequency shift keying, minimum-shift keying, etc.), or any other protocol or system capable of providing a constant envelope signal to allow measurement.

In some implementations, the power trimming hardware may read the voltage or transmission power from a TSSI sensor and may adjust the transmitter gain until the desired target power is reached. In some implementations, a hardware look-up table may be populated with a voltage to decibel-milliwatt (dBm) mapping, and may be used to convert the measured TSSI to an equivalent dBm value. This may allow the device to use a power target value stored in firmware in a similar dBm format. In other implementations, the firmware may store a power target in another format (e.g. in a format corresponding to the output of the TSSI sensor or digitized output, such as dBFS). The power trimming hardware may ramp the FSK signal to the corresponding voltage to correct for any transmission power drift from the target power. In some implementations, the power trimming ramp may be smoothed by filtering its steps using a raised cosine filter or other equivalent filter. For power variation over frequency, in some implementations, a frequency interpolator may be included so that the system does not need to calculate different power target values for different frequencies or channels. This may reduce the data needed to be stored by firmware or memory of the device.

FIG. 1A is a block diagram depicting an embodiment of a wireless communication device 100 implementing in-packet power trimming. For clarity and simplicity, only the transmission stage 102, control stage 104, and antenna 116 are illustrated; implementations of the device may include many additional stages and components, including processors, memory, wireless receive stages, input/output devices, etc., or any other such components, including the various components discussed below in connection with section B.

In some implementations of a transmission stage 102, a modulation signal or data to be transmitted may be processed by digital transmitter circuitry (e.g. encoding, packetizing, etc.) and converted into an analog signal by a digital to analog converter 108. In many implementations, the resulting analog signal may be filtered, e.g. by low pass filter 110, and modulated by a mixer and local oscillator 112 tuned to a transmission carrier frequency. The modulated signal may be amplified by a power amplifier 114 and broadcast via an antenna 116.

To control transmission power of the transmission stage 102, in some implementations, the output of the power amplifier 114 may be provided to a control stage 104 for measurement and power correction (e.g. tapped prior to transmission by antenna 116). The control stage 104 may comprise a transmitted signal strength indicator (TSSI) detector circuit, which may comprise a power-to-voltage meter or similar circuitry. In some implementations, the TSSI detector circuit may comprise an amplifier to produce a full-wave or half-wave rectified output, a low pass filter for envelope detection, and/or other components for producing an voltage proportional to a magnitude of the transmitted power envelope. In some implementations, the TSSI detector circuit may comprise a power detector configured to measure the power of the transmission stage and provide a measurement signal proportional to the measured power. In other implementations, the TSSI detector circuit may comprise a voltage detector configured to measure a voltage of an envelope of the output of the transmission stage, and provide a measurement signal proportional to the measured voltage. In some implementations, the TSSI detector circuit may comprise any of the implementations of TSSI detectors described in U.S. Pat. No. 7,620,371, which is incorporated herein by reference.

In some implementations, the TSSI output voltage may be digitized by an analog to digital converter 120 and digital receiver 122 to generate a digital TSSI signal in decibels-full scale. Although shown separately, in some implementations, ADC 120 and digital receiver 122 may be part of TSSI detector 118.

In some implementations, power trimming circuitry 124 may receive the TSSI dBFS signal and convert the signal to an output power measurement in dBm. This may be done to allow direct comparison of the measured transmission power in dBm to a target transmission power, similarly in dBm and stored in firmware 126 or other memory storage, to determine a required power correction in dB (e.g. determining a difference between the measured transmission power and target transmission power). In some implementations in which the relationship between the output of the TSSI detector circuitry and output power is linear, the conversion may be performed via a linear function (e.g. adding an offset and multiplying by a coefficient), while in other implementations, the TSSI output signal may be mapped to a transmission power via a lookup table, which may be stored in firmware 126 or other memory. The lookup table may be generated during calibration of the TSSI detector circuit 118 by sweeping transmission power over a specified range and measuring the TSSI detector output voltage. However, as discussed above, the table may be agnostic to temperature changes, packet type, mode of operation, or target power level, significantly reducing the amount of calibration of the device required, as well as reducing the amount of memory required for storage of calibration parameters in firmware 126.

The power trimming circuitry 124 may adjust the digital gain of the of the transmitter 106 until the target power is met, e.g. by ramping up power until reaching a desired level. In some implementations, this ramp up may be performed over a number of iterations of measurement and adjustment, providing higher granularity of adjustments.

In some implementations discussed in more detail below, the power trimming circuitry 124 may control the TSSI detector circuitry to measure the transmitted power during a specified portion of a transmission, such as a constant envelope modulated signal of a Bluetooth packet header or similar signal. This measurement may be triggered after ramp up of the transmission power from a non-transmitting level, to avoid inaccurate measurements prior to stabilization of the transmission stage 102.

Figure 1B:
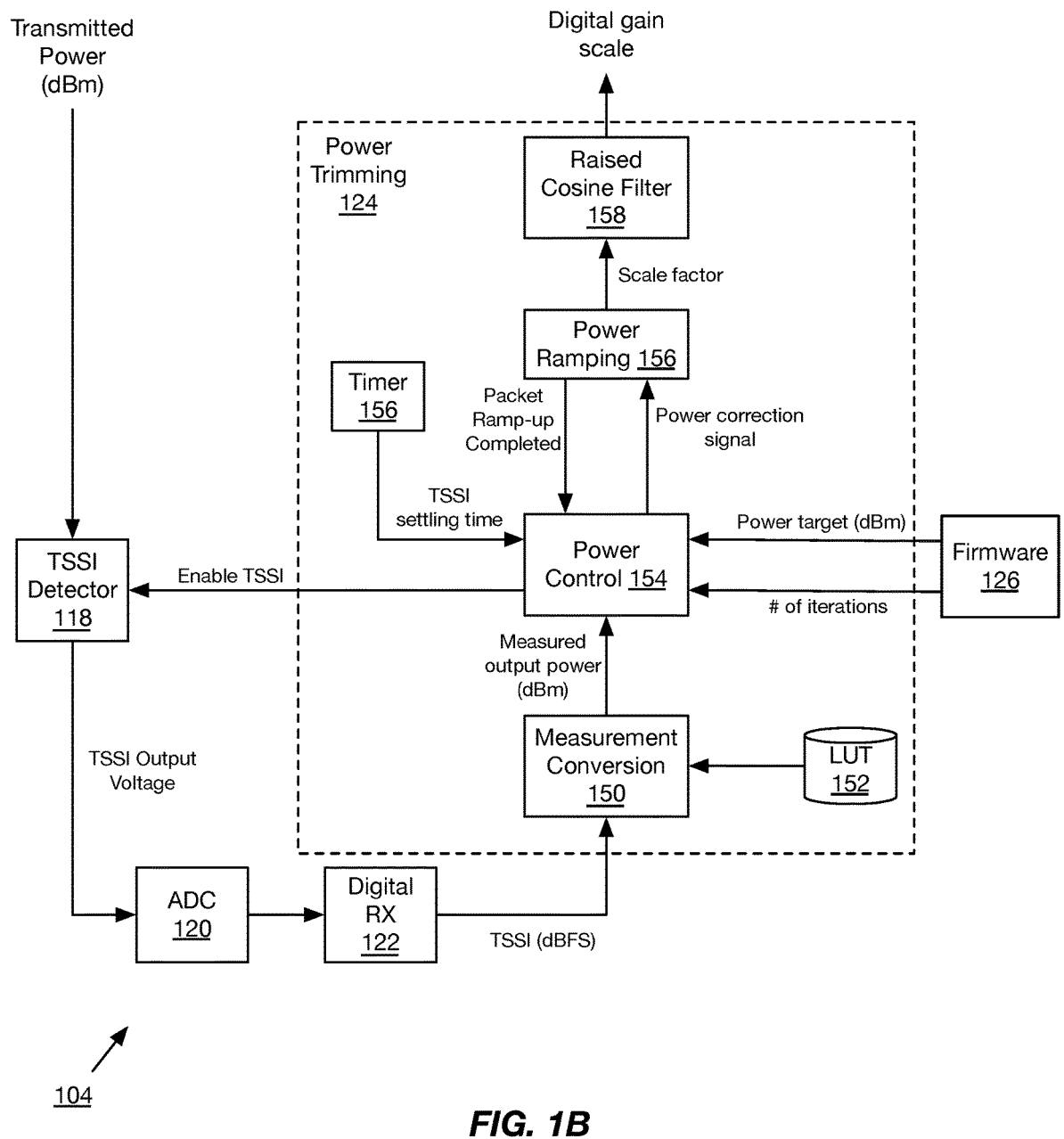
FIG. 1B is a block diagram depicting an implementation of a control stage of the embodiment of FIG. 1A.

Referring now to FIG. 1B, illustrated is a block diagram depicting an implementation of a control stage 104 of the embodiment of FIG. 1A. As shown, power trimming circuitry 124 may comprise measurement conversion circuitry 150, memory storing a lookup table or conversion function 152 as discussed above, power control circuitry 154, power ramping circuitry 156, filter circuitry 158, and, in some implementations, a timer 156. In some implementations, circuitry 150-158 may be provided via a processor such as any of the processors discussed below in connection with section B, or may be provided via other circuitry such as a FPGA, ASIC, or other such components.

Still referring to FIG. 1B and in more detail, measurement conversion circuitry 150 may comprise a processor, FPGA, ASIC, or other such circuitry for converting a digital TSSI measurement to measured output power in dBm according to a linear function or values encoded in lookup table 152. Measurement conversion circuitry 150 may comprise hardware, software (e.g. executed by a processor), or a combination of hardware and software. Although shown separate from firmware 126, in many implementations, lookup table 152 may be stored in firmware 126 and accessed by measurement conversion circuitry. Mappings between TSSI measurements in dBFS and transmission power in dBm may be generated during calibration of the TSSI detector circuitry, as discussed above. For example, the transmission stage may be swept across a range of transmission powers, and the TSSI detector voltage may be measured over the power range of interest, with the resulting digitized values mapped to the corresponding transmission power.

Power control circuitry 154 may comprise a processor, FPGA, ASIC, or other such circuitry for generating a power correction signal (e.g. in decibels) based on difference between a transmission power target value (e.g. retrieved from firmware 126) and a measured output power value (e.g. received from measurement conversion circuitry 150). Power control circuitry 154 may comprise hardware, software (e.g. executed by a processor), or a combination of hardware and software.

Power ramping circuitry 156 may comprise a processor, FPGA, ASIC, or other such circuitry for generating a linear scaling factor based on the power correction signal. Power ramping circuitry 156 may comprise hardware, software (e.g. executed by a processor), or a combination of hardware and software. In some implementations, the scaling factor may be positive or negative, based on the sign of the power correction signal (e.g. positive to increase transmission power responsive to measured transmission power being less than the target transmission power, or negative to decrease transmission power responsive to measured transmission power being greater than the target transmission power). The linear scaling factor may be directly or indirectly proportional to the power correction signal in various implementations, e.g. based on design of the transmission stage 102 or to provide smaller or greater adjustments to transmission power.

Filter 158 may comprise a raised cosine filter, in some implementations, though other filter types may be used in other implementations (e.g. low pass filter, sinc filter, etc.). Filter 158 may comprise hardware, software (e.g. executed by a processor), or a combination of hardware and software. Filter 158 may be used to smooth the ramp up/down steps and avoid abrupt gain changes from the scaling factor.

Figure 2:
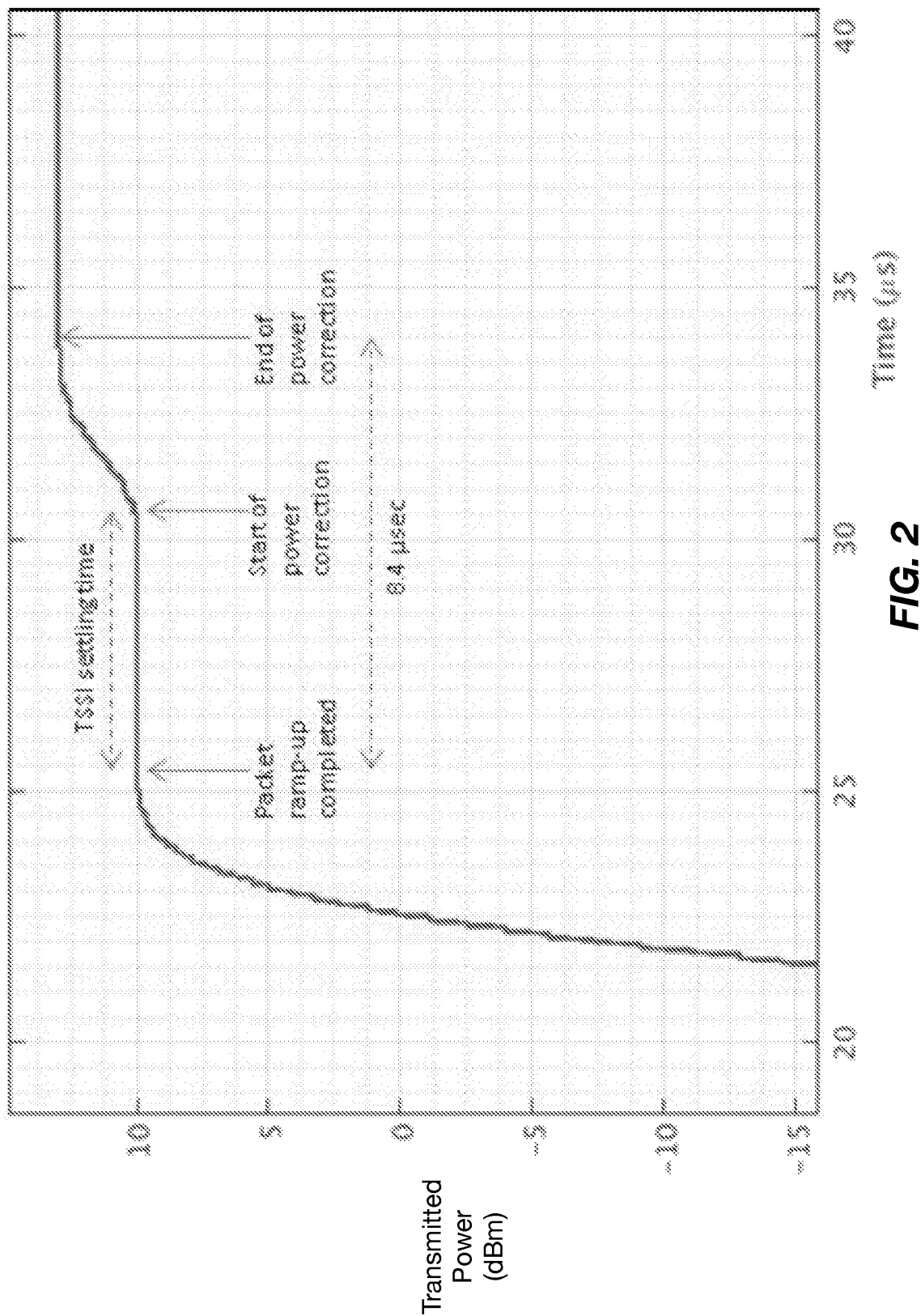
FIG. 2 is a graph depicting an example of transmitted power over time, according to some implementations of in-packet power trimming.

As discussed above, in many implementations, TSSI measurement may be enabled after a transmission ramp-up is complete. For example, referring briefly to FIG. 2, illustrated is a graph depicting an example of transmitted power over time, according to some implementations of in-packet power trimming. As shown, during a first portion of the transmission (e.g. approximately 21-25 μs in the illustrated example), the output power may ramp up to an initial target output power. Measuring TSSI and adjusting output power during this phase may result in unintentionally increasing the output power; accordingly, in many implementations, TSSI measurement may be delayed or disabled until ramp-up is complete (or earlier measurements disregarded, in some implementations).

Furthermore, in many implementations, TSSI measurements may be less accurate as the transmission power varies, and so the power trimming circuitry 124 may wait for a period of time after ramp-up is complete prior to beginning the measurement and adjustment process (shown in FIG. 2 as TSSI settling time). Returning briefly to FIG. 1B, this may be controlled by a timer 156 maintained by the power control circuitry 154 or power trimming circuitry 124. In some implementations, timer 156 may be set to a predetermined duration, while in other implementations, timer 156 may be set dynamically to a duration proportional to a bandwidth of TSSI detector 118. In some implementations, the timer duration may be based on a carrier frequency of the transmission. Upon expiration of timer 156, the measurement and adjustment process may begin.

In the example implementation of FIG. 2, the power target is 13 dBm and the measured output power (e.g. after a 5 μs TSSI settling period) is 10 dBm. The power is increased by 3 dB, requiring 3.4 μs in the example implementation; as a result, the total time for power correction is a mere 8.4 μs. In other implementations, this may be faster or slower depending on time to measure and process the adjustment, time allowed for the TSSI measurement to settle, etc.

In some implementations, the adjustment of transmission power may have some amount of error, e.g. due to quantization, TSSI sensor noise, or other such sources. In some such implementations, the measurement and adjustment process may be iterated one or more additional times, further correcting the amplifier gain adjustment and reducing error until reaching the target power. In some implementations, the process may be re-iterated a predetermined number of times, while in other implementations, the process may be re-iterated responsive to a difference between measured power and target power being greater than a threshold (e.g. based on a required target power accuracy for the protocol).

Figure 3:
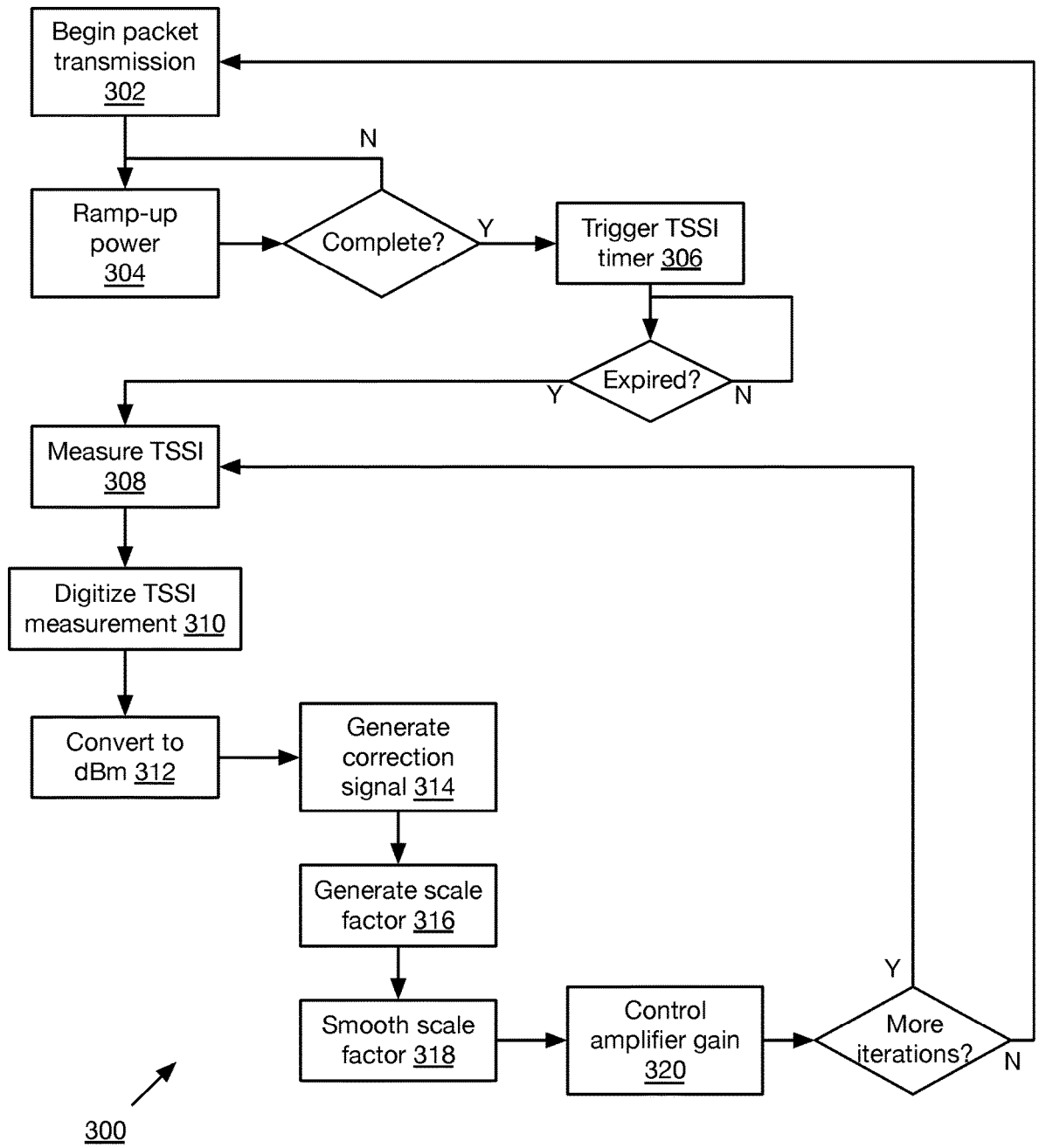
FIG. 3 is a flow chart of a method for in-packet power trimming, according to some implementations.

FIG. 3 is a flow chart of a method 300 for in-packet power trimming, according to some implementations. At step 302, a device may begin broadcasting or transmitting a packet or other data. In many implementations, the data may be in a Bluetooth or similar protocol, and may include a packet header or other intro with a constant envelope or amplitude that may be used for transmission power measurement. As discussed above, because the system may take some non-zero amount of time to begin broadcasting at the intended power level, at step 304, power control circuitry of the device may monitor the amplifier ramp-up until reaching a steady power state. Once complete, in some implementations, a TSSI stabilization timer may be triggered at step 306. As discussed above, the trigger duration may be predetermined or may be dynamically adjusted, e.g. based on frequency or bandwidth.

Upon expiration of the timer, at step 308, a TSSI detector circuit may measure a transmitted power output of an amplifier of a transmission stage of the device (e.g. at or prior to the antenna). In some implementations, the measurement may be an analog voltage. In some such implementations, at step 310, the measurement may be digitized and quantized into a dB FS value. At step 312 in some implementations, the quantized measurement may be converted to an equivalent value in dBm. In some implementations in which the relationship between the transmission power and the TSSI measurement is linear, the measurement may be converted according to a linear function (e.g. adding an offset and multiplying by a coefficient). In other implementations, the measurement may be converted according to values in a lookup table stored in memory or firmware of the device, and generated from measurements during calibration of the TSSI detector.

At step 314, power control circuitry of the device may generate a power correction signal based on a difference between the converted TSSI measurement and an output power target value (e.g. stored in firmware or received from a processor of the device). The power correction signal may be positive or negative, depending on whether the TSSI measurement is less than or greater than the output power target value. At step 316, power ramping circuitry of the device may generate a power scaling factor to control gain of an amplifier of a transmission stage of the device (e.g. a digital transmitter). In some implementations, this power scaling factor may be smoothed by a filter of the device at step 318 to prevent large adjustment steps from being provided to the transmitter. At step 320, the amplifier gain may be adjusted according to the power scaling factor. The gain value may be provided as an analog or digital gain value to one or more components in the transmission stage, including power amplifiers, drivers, filters, mixers, encoders, etc.

In some implementations as discussed above, steps 308-320 may be repeated or iteratively applied to increase accuracy of the power adjustment. In some implementations, these steps may be repeated a predetermined number of times, while in other implementations, the steps may be repeated responsive to a difference between the TSSI measurement and the output power target value exceeding a threshold (e.g. ±1 dB, ±3 dB, or any other such value).

Accordingly, the systems and methods discussed herein provide implementations of power amplifier gain trimming using closed loop power control. Power is compensated dynamically for each packet, e.g. during transmission of a header of the packet, significantly reducing power drift. Only the transmitted signal strength indicator (TSSI) detector circuitry needs to be factory calibrated, reducing calibration effort and thus reducing manufacturing time and costs. Temperature compensation algorithms may be obviated and tables may be replaced or eliminated in some implementations, reducing memory requirements in firmware or other storage of the device, and the power control scheme of the device may be simplified.

In one aspect, the present disclosure is directed to a system for in-packet transmission power control. The system includes measurement circuitry in communication with a transmission stage of a device, the measurement circuitry configured to generate a transmitted signal strength measurement signal based on an output of the transmission power amplifier during transmission of a packet. The system also includes measurement conversion circuitry connected to the measurement circuitry, the measurement conversion circuitry configured to convert the transmitted signal strength measurement signal from the measurement circuitry to an output power measurement. The system also includes power control circuitry connected to the measurement conversion circuitry, the power control circuitry configured to generate a power correction signal based on the output power measurement and an output power target value. The system also includes power ramping circuitry connected to the power control circuitry, the power ramping circuitry configured to provide a gain signal to the transmission stage of the device based on the power correction signal.

In some implementations, the measurement circuitry comprises a digital transmitted signal strength indicator (TSSI) circuit configured to generate the measurement signal proportional to an envelope of the output of the transmission stage during transmission of the packet. In some implementations, the measurement circuitry comprises a power detector configured to generate the measurement signal proportional to a power of the output of the transmission stage during transmission of the packet. In some implementations, the measurement circuitry comprises a voltage detector configured to generate the measurement signal proportional to a voltage of an envelope of the output of the transmission stage during transmission of the packet. In some implementations, the measurement conversion circuitry comprises a look-up table mapping a plurality of transmitted signal strength measurement signal values to a corresponding plurality of output power measurements. In a further implementation, the look-up table mapping comprises a non-linear mapping between transmitted signal strength measurement signal values in a first digital scale and output power measurements in a second analog scale.

In some implementations, the power control circuitry comprises a timer triggered upon completion of power ramp-up of the transmission stage. In a further implementation, the power control circuitry is configured to generate the power correction signal responsive to expiration of the timer. In another further implementation, a duration of the timer is set proportional to a bandwidth of the measurement circuitry.

In some implementations, the power ramping circuitry comprises a filter configured to smooth the gain signal. In some implementations, the gain signal comprises a digital gain value provided to a digital transmitter of the transmission stage. In some implementations, the gain signal comprises an analog or digital gain value provided to an analog component of the transmission stage. In some implementations, the power control circuitry is agnostic to temperature of the transmission stage.

In another aspect, the present disclosure is directed to a method for in-packet transmission power control. The method includes measuring, by measurement circuitry of a device, a transmitted signal strength measurement signal based on an output of a transmission stage of the device during transmission of a packet. The method also includes converting, by measurement conversion circuitry connected to the measurement circuitry, the transmitted signal strength measurement signal from the measurement circuitry to an output power measurement. The method also includes generating, by power control circuitry connected to the measurement conversion circuitry, a power correction signal based on the output power measurement and an output power target value. The method also includes providing, by power ramping circuitry connected to the power control circuitry, a gain signal to the transmission stage of the device based on the power correction signal.

In some implementations, the method includes generating the measurement signal, by a digital transmitted signal strength indicator (TSSI) circuit of the measurement circuitry, the measurement signal proportional to an envelope of the output of the transmission stage during transmission of the packet. In some implementations, the method includes generating the measurement signal, by a power detector of the measurement circuitry, the measurement signal proportional to a power of the output of the transmission stage during transmission of the packet. In some implementations, the method includes generating the measurement signal, by a voltage detector of the measurement circuitry, the measurement signal proportional to a voltage of an envelope of the output of the transmission stage during transmission of the packet. In some implementations, the method includes converting, by the measurement conversion circuitry, the transmitted signal strength measurement signal to the output power measurement according to a look-up table mapping a plurality of transmitted signal strength measurement signal values to a corresponding plurality of output power measurements. In a further implementation, the look-up table mapping comprises a non-linear mapping between transmitted signal strength measurement signal values in a first digital scale and output power measurements in a second analog scale.

In some implementations, the method includes triggering a timer of the power control circuitry upon completion of power ramp-up of the transmission stage. In a further implementation, the method includes generating the power correction signal responsive to expiration of the timer. In another further implementation, the method includes setting a duration of the timer proportional to a bandwidth of the measurement circuitry.

In some implementations, the method includes smoothing, by a filter of the power ramping circuitry, the gain signal. In some implementations, the method includes providing a digital gain value to a digital transmitter of the transmission stage. In some implementations, the method includes providing an analog or digital gain value to an analog component of the transmission stage. In some implementations, the power control circuitry is agnostic to temperature of the transmission power amplifier.

B. Computing and Network Environment

Figure 4A:
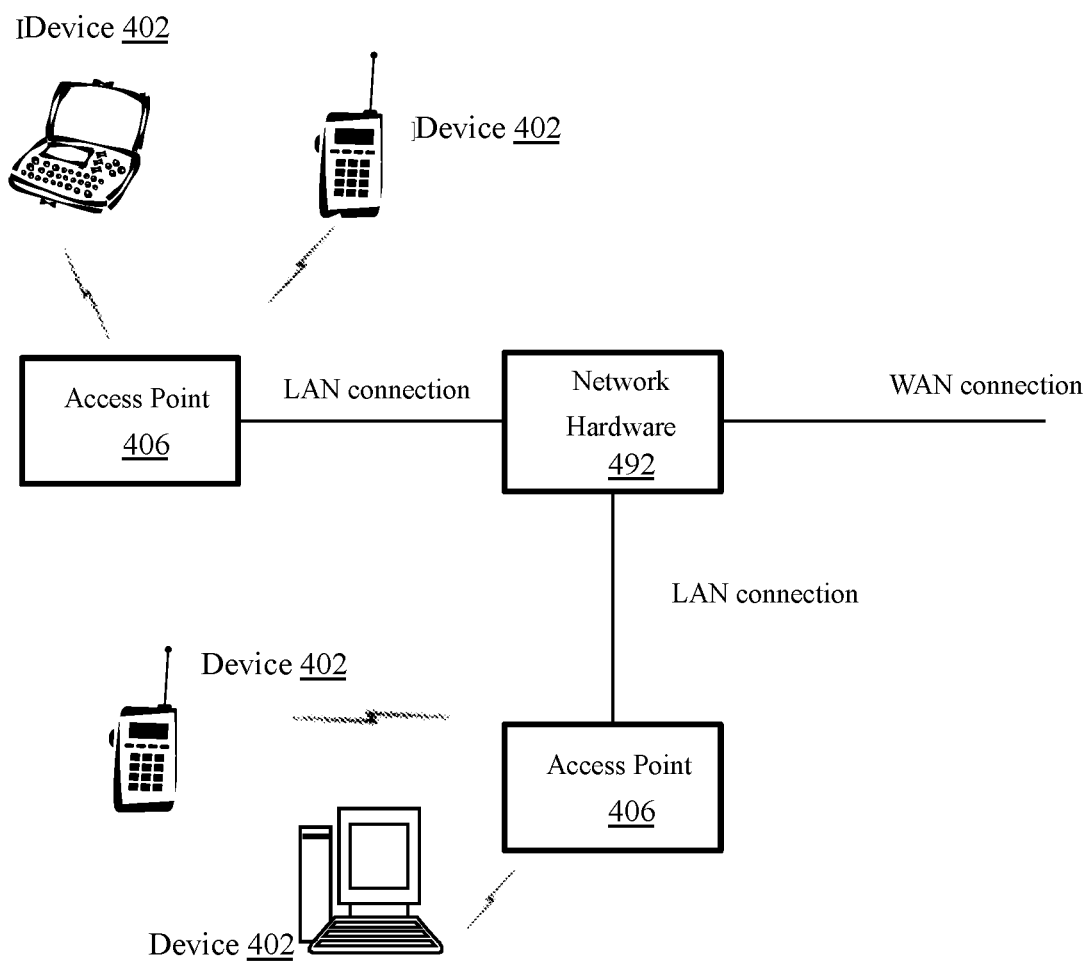
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
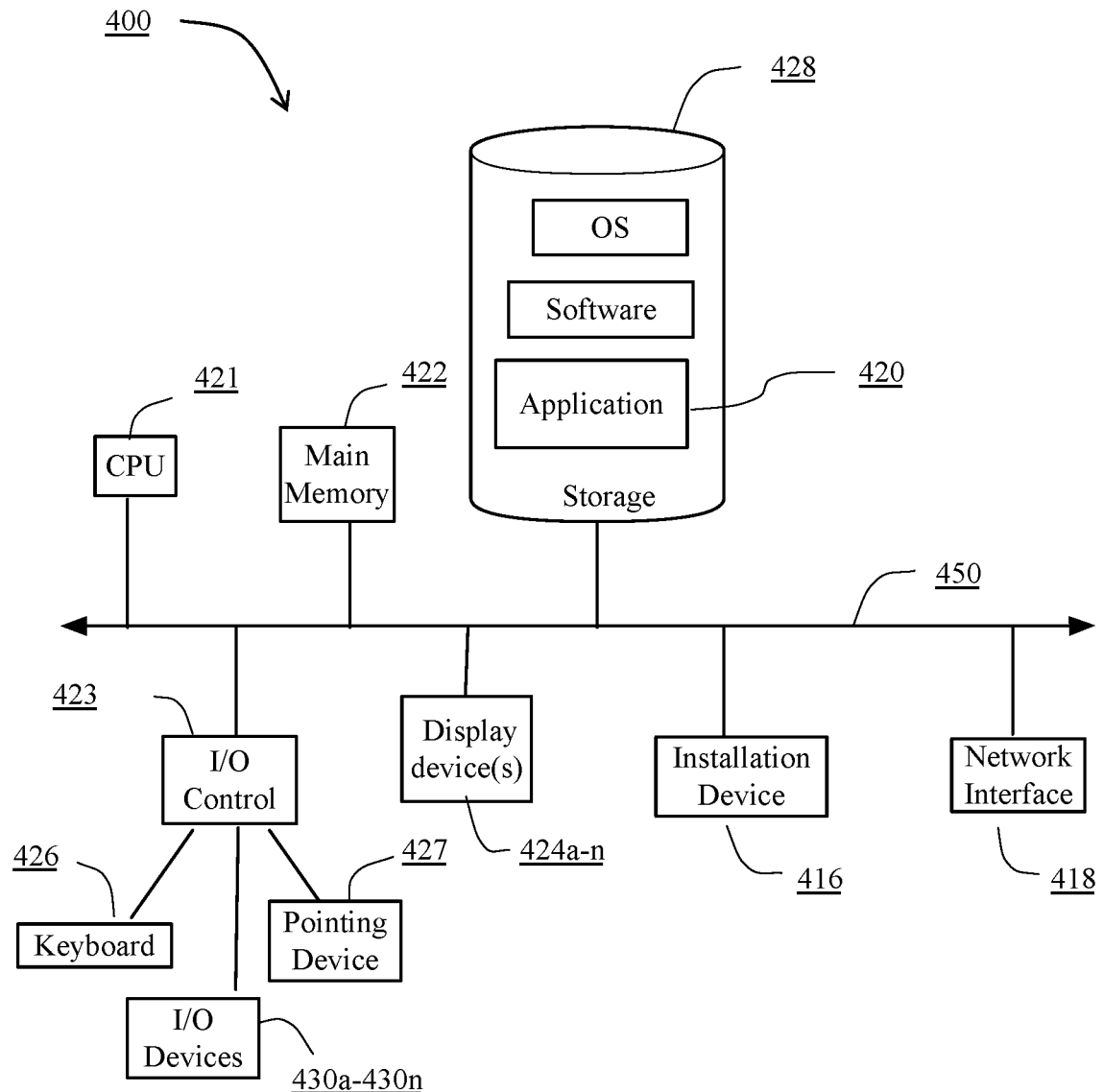
FIGS. 4B and 4C are block diagrams depicting embodiments of computing devices useful in connection with the methods and systems described herein.
Figure 4C:
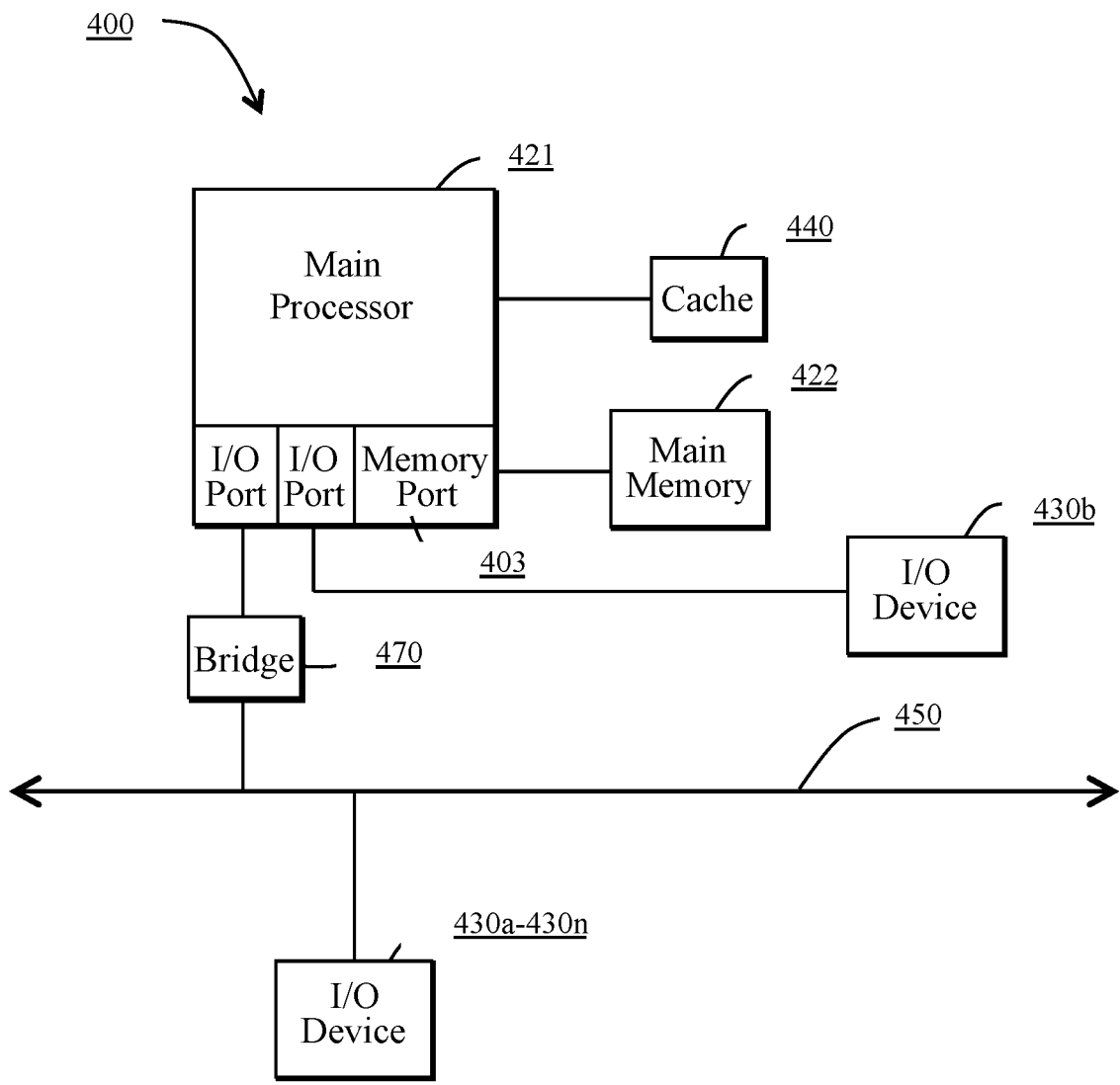

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for in-packet transmission power control, comprising:
   measurement circuitry in communication with a transmission stage of a device, the measurement circuitry configured to generate a transmitted signal strength measurement signal based on an output of a transmission power amplifier of the transmission stage during transmission of a packet;
   measurement conversion circuitry connected to the measurement circuitry, the measurement conversion circuitry configured to convert the transmitted signal strength measurement signal from the measurement circuitry to an output power measurement;
   power control circuitry connected to the measurement conversion circuitry comprising a timer triggered upon completion of power ramp-up of the transmission stage, the power control circuitry configured to generate a power correction signal based on the output power measurement and an output power target value; and
   power ramping circuitry connected to the power control circuitry, the power ramping circuitry configured to provide a gain signal to the transmission stage of the device based on the power correction signal.

2. The system of claim 1, wherein the measurement circuitry comprises a digital transmitted signal strength indicator (TSSI) circuit configured to generate the measurement signal proportional to an envelope of the output of the transmission stage during transmission of the packet.

3. The system of claim 1, wherein the measurement circuitry comprises a power detector configured to generate the measurement signal proportional to a power of the output of the transmission stage during transmission of the packet.

4. The system of claim 1, wherein the measurement circuitry comprises a voltage detector configured to generate the measurement signal proportional to a voltage of an envelope of the output of the transmission stage during transmission of the packet.

5. The system of claim 1, wherein the measurement conversion circuitry comprises a look-up table mapping a plurality of transmitted signal strength measurement signal values to a corresponding plurality of output power measurements.

6. The system of claim 5, wherein the look-up table mapping comprises a non-linear mapping between transmitted signal strength measurement signal values in a first digital scale and output power measurements in a second analog scale.

7. The system of claim 1, wherein the power control circuitry is configured to generate the power correction signal responsive to expiration of the timer.

8. The system of claim 1, wherein a duration of the timer is set proportional to a bandwidth of the measurement circuitry.

9. The system of claim 1, wherein the power ramping circuitry comprises a filter configured to smooth the gain signal.

10. The system of claim 1, wherein the gain signal comprises a digital gain value provided to a digital transmitter of the transmission stage.

11. The system of claim 1, wherein the gain signal comprises an analog or digital gain value provided to an analog component of the transmission stage.

12. The system of claim 1, wherein the power control circuitry is agnostic to temperature of the transmission stage.

13. A method for in-packet transmission power control, comprising:
    measuring, by measurement circuitry of a device, a transmitted signal strength measurement signal based on an output of a transmission power amplifier of a transmission stage of the device during transmission of a packet;
    converting, by measurement conversion circuitry connected to the measurement circuitry, the transmitted signal strength measurement signal from the measurement circuitry to an output power measurement;
    triggering a timer of the power control circuitry upon completion of power ramp-up of the transmission stage;
    generating, by power control circuitry connected to the measurement conversion circuitry responsive to expiration of the timer, a power correction signal based on the output power measurement and an output power target value; and
    providing, by power ramping circuitry connected to the power control circuitry, a gain signal to the transmission stage of the device based on the power correction signal.

14. The method of claim 13, further comprising generating the measurement signal, by a digital transmitted signal strength indicator (TSSI) circuit of the measurement circuitry, the measurement signal proportional to an envelope of the output of the transmission stage during transmission of the packet.

15. The method of claim 13, further comprising generating the measurement signal, by a power detector of the measurement circuitry, the measurement signal proportional to a power of the output of the transmission stage during transmission of the packet.

16. The method of claim 13, further comprising generating the measurement signal, by a voltage detector of the measurement circuitry, the measurement signal proportional to a voltage of an envelope of the output of the transmission stage during transmission of the packet.

17. The method of claim 13, further comprising converting, by the measurement conversion circuitry, the transmitted signal strength measurement signal to the output power measurement according to a look-up table mapping a plurality of transmitted signal strength measurement signal values to a corresponding plurality of output power measurements.

18. The method of claim 17, wherein the look-up table mapping comprises a non-linear mapping between transmitted signal strength measurement signal values in a first digital scale and output power measurements in a second analog scale.

19. The method of claim 13, further comprising setting a duration of the timer proportional to a bandwidth of the measurement circuitry.

20. The method of claim 13, further comprising smoothing, by a filter of the power ramping circuitry, the gain signal.

21. The method of claim 13, wherein providing the gain signal further comprises providing a digital gain value to a digital transmitter of the transmission stage.

22. The method of claim 13, wherein providing the gain signal further comprises providing an analog or digital gain value to an analog component of the transmission stage.

23. The method of claim 13, wherein the power control circuitry is agnostic to temperature of the transmission power amplifier.

* * * * *